(12) United States Patent
Chung

(10) Patent No.: US 8,982,720 B2  
(45) Date of Patent: Mar. 17, 2015

(54) IMAGE PROCESSING APPARATUS AND A METHOD FOR CONNECTING HDMI ETHERNET CHANNEL THEREOF

(75) Inventor: Ji-min Chung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 13/528,394

(22) Filed: Jun. 20, 2012

(65) Prior Publication Data

US 2013/0038797 A1  Feb. 14, 2013

(30) Foreign Application Priority Data

Aug. 9, 2011  (KR) .................. 10-2011-0079320

(51) Int. Cl.
| | |
|---|---|
| H04L 12/28 | (2006.01) |
| H04N 21/4363 | (2011.01) |
| H04N 21/436 | (2011.01) |
| H04L 12/919 | (2013.01) |
| H04L 12/801 | (2013.01) |
| H04L 12/911 | (2013.01) |

(52) U.S. Cl.
CPC ... H04N 21/43635 (2013.01); H04N 21/43615 (2013.01); H04L 12/2838 (2013.01); H04L 47/765 (2013.01); H04L 47/29 (2013.01); H04L 47/822 (2013.01); *H04L 2012/2849* (2013.01)
USPC ........... 370/252; 370/474; 370/466; 370/389; 370/392; 370/236

(58) Field of Classification Search
CPC ............ H04L 12/56; H04L 2012/5629; H04L 2012/5636; H04L 47/70
USPC .............. 370/252, 412, 389, 395.2, 392, 466, 370/474, 230, 236
See application file for complete search history.

(56) References Cited

U.S. PATENT DOCUMENTS

| | | | |
|---|---|---|---|
| 6,697,370 B1* | 2/2004 | Doi et al. ................. | 370/395.21 |
| 7,209,443 B2* | 4/2007 | Mukai et al. .................. | 370/235 |
| 8,108,567 B2* | 1/2012 | Bohm .............................. | 710/14 |
| 8,185,120 B2* | 5/2012 | Hassan et al. ................. | 455/442 |
| 8,479,227 B2* | 7/2013 | Douillet .......................... | 725/31 |
| 2009/0005053 A1* | 1/2009 | Agin et al. ..................... | 455/450 |
| 2009/0296731 A1* | 12/2009 | Lida et al. ..................... | 370/449 |
| 2011/0138439 A1* | 6/2011 | Toba ............................ | 725/148 |
| 2011/0181781 A1* | 7/2011 | Oh et al. ....................... | 348/565 |

OTHER PUBLICATIONS

Communication, dated Dec. 10, 2012, issued by the European Patent Office in counterpart European Patent Application No. 12162238.5.
"High-Definition Multimedia Interface: Specification Version 1.4," HDMI Licensing, LLC, XP009133650, Jun. 5, 2009, 425 pages.

(Continued)

Primary Examiner — Rasheed Gidado  
(74) Attorney, Agent, or Firm — Sughrue Mion, PLLC

(57) ABSTRACT

An image processing apparatus includes an interface unit connected to source devices through HDMI Ethernet Channels (HEC). A HEC bandwidth detection unit detects the HEC bandwidth used in the source devices. A bandwidth comparison unit compares the detected HEC bandwidth with a first critical value set on the basis of an upstream bandwidth capacity of an image processing apparatus. A control unit adjusts the connection to at least one of the source devices based on the comparison result output by the bandwidth comparison unit.

19 Claims, 4 Drawing Sheets

(56) References Cited

OTHER PUBLICATIONS

Lee, HyunRyong, et al., "UPnP-based QoS Agent for QoS-guaranteed Streaming Service in Home Networks," Consumer Communications and Networking Conference, IEEE, Las Vegas, NV, USA, vol. 1, Jan. 8-10, 2006, pp. 543-547.

Suraci, Vincenzo, et al., "Admission Control and Drop Strategies in a UPnP-QoS Controlled Home Network," IEEE 21st International Symposium on Personal Indoor and Mobile Radio Communications, Sep. 26, 2010, pp. 2811-2816.

Brewka, Lukasz, et al., "Evaluation of Lightweight Preemption Algorithms for UPnP QoS Architecture," Communications and Networking in China, IEEE 5th International ICST Conference, Aug. 25, 2010, pp. 1-5.

Choi, Sung-Gi, et al., "An UPnP based Media Distribution System supporting QoS in a Converged Home Network," Network Operations and Management Symposium, IEEE/IFIP, Vancouver, BC, Canada, Apr. 3-7, 2006, pp. 1-4.

Lee, HyunYong, et al., "Enhanced UPnP QoS Architecture for Network-adaptive Streaming Service in Home Networks," IEEE Transactions on Consumer Electronics, vol. 53, No. 3, Aug. 1, 2007, pp. 898-904.

Lei, Bao, et al., "QoS-aware Residential Gateway," Proceedings of the 27th Annual IEEE Conference on Local Computer Networks, Nov. 6-8, 2002, pp. 518-524.

"UPnP-QoS Architecture:3," Contributing Members of the UPnP Forum, Nov. 30, 2008, pp. 1-47, http://www.upnp.org/specs/qos/UPnP-qos-Architecture-v3-20081130.pdf.

"UPnP QosManager:3," Contributing Members of the UPnP Forum, Nov. 30, 2008, pp. 1-89, http://www.upnp.org/spec/qos/qos3/UPnP-qos-QosManager-v3-Service.pdf.

"UPnP QosDevice:3," Contributing Members of the UPnP Forum, Nov. 30, 2008, pp. 1-113, http://www.upnp.org/spec/qos/qos3/UPnP-qos-QosDevice-v3-Service.pdf.

"UPnP QosPolicyHolder:3," Contributing Members of the UPnP Forum, Nov. 30, 2008, pp. 1-36, http://www.upnp.org/spec/qos/qos3/UPnP-qos-QosPolicyHolder-v3-Service.pdf.

\* cited by examiner

IMAGE PROCESSING APPARATUS AND A METHOD FOR CONNECTING HDMI ETHERNET CHANNEL THEREOF

CROSS-REFERENCE TO RELATED APPLICATIONS

This application claims priority from Korean Patent Application No. 10-2011-0079320, filed on Aug. 9, 2011, in the Korean Intellectual Property Office, the disclosure of which is incorporated herein by reference in its entirety.

BACKGROUND

1. Field

Methods and apparatuses consistent with exemplary embodiments relate to an image processing apparatus and a method for connecting a HDMI Ethernet Channel (HEC) thereof, and, more particularly, to an image processing apparatus connected to a plurality of source devices, and a method for controlling the HEC connections thereof 2. Description of the Related Art Current trends indicate that as the dissemination of digital contents becomes more popular, a growing number of users are connecting multimedia source devices, such as camcorders, DVD (Digital Versatile Disc) players, video game consoles, set-top boxes, etc., to image apparatuses such as monitors and digital TVs. These image apparatuses process and display the digital contents provided from the multimedia source devices.

The High Definition Multimedia Interface (HDMI) has been standardized as a digital interface for data transmission between the multimedia source devices and image apparatuses. HDMI is a multimedia interface which combines together uncompressed digital audio and video, and transmits the combined digital audio and video. HDMI is becoming a standard for protecting digital contents in a high-resolution image apparatus.

Since HDMI version 1.4, Ethernet has been a feature of HDMI, and is made available in the HEC. However, in circumstances where HECs from various source devices are used at the same time in a restricted upstream bandwidth environment, a problem can arise in that the quality of the network tends to deteriorate, and the difficulty lies in responding to such a problem.

Conventionally, when a plurality of multimedia source devices are connected through HEC, and the available upstream bandwidth is exceeded, this affects all of the connected multimedia source devices.

SUMMARY

Exemplary embodiments address at least the above problems and/or disadvantages, and may address other disadvantages not described above. It should also be pointed out that not every exemplary embodiment mentioned below necessarily overcomes the disadvantages or problems described above.

The inventive concept involves the way to help prevent the deterioration of network quality of a source device which is being watched in the event that the HDMI Ethernet Channel (HEC) bandwidth of a plurality of source devices exceeds the upstream bandwidth capacity of an image processing apparatus, and a method for controlling the connecting of HEC thereof.

According to an exemplary embodiment, there is provided an image processing apparatus having an interface unit connected to a plurality of source devices through HDMI Ethernet Channel (HEC), a HEC bandwidth detect unit which detects HEC bandwidth used in the plurality of source devices, a bandwidth comparison unit which compares the detected HEC bandwidth with a first critical value set on the basis of upstream bandwidth capacity of the image processing apparatus, and a control unit which adjusts a connection to at least one of the plurality of source devices according to the result of comparison of the bandwidth comparison unit.

The control unit may interrupt the HEC connection to at least one source device, among the remaining source devices, with the exception of the source device or devices which is/are being watched, when the HEC bandwidth exceeds the first critical value.

The control unit may narrow the HEC bandwidth connected to at least one source device when the HEC bandwidth exceeds the first critical value as a result of comparison of the bandwidth comparison unit.

The control unit may resume the HEC connection to at least one source device among the source devices from which the HEC connection was disconnected when the bandwidth between HEC and the watched source device, i.e., the source device from which content is being displayed, is less than a second critical value set on the basis of the upstream bandwidth capacity.

The control unit may resume the HEC connection to at least one source device among the source devices from which the HEC connection was disconnected, according to priority already set by a user.

The control unit may resume the HEC connection to at least one source device among the source devices from which the HEC connection is disconnected, according to the user's frequency of use of the source devices from which the HEC connection is disconnected.

The control unit may select sequentially at least one source device among the source devices from which the HEC connection is disconnected, and resume the HEC connection thereto.

The control unit may detect the HEC bandwidth when a new source device is connected to the interface unit, and in order to compare the first critical value with the detected HEC bandwidth, control the HEC bandwidth detect unit and the bandwidth comparison unit, and the control unit may interrupt the HEC connection to the remaining source devices with the exception of the source devices from which content is being displayed and the new source device when the HEC bandwidth exceeds the first critical value as a result of comparison of the bandwidth comparison unit.

The control unit may detect the HEC bandwidth when a new source device is connected to the interface unit, and in order to compare the first critical value with the detected HEC bandwidth, control the HEC bandwidth detect unit and the bandwidth comparison unit, and the control unit may interrupt the HEC connection to the new source device when the HEC bandwidth exceeds the first critical value as a result of comparison of the bandwidth comparison unit.

According to another exemplary embodiment, there is provided a method for controlling HDMI Ethernet Channel (HEC) connections of an image processing apparatus, the method comprising detecting the HEC bandwidth used in a plurality of source devices connected through HEC, comparing the detected HEC bandwidth with a first critical value set on the basis of an upstream bandwidth capacity available to the image processing apparatus, and outputting the comparison result, and adjusting the connection to at least one of the plurality of source devices according to the comparison result.

When the comparison result indicates that the detected HEC bandwidth exceeds the first critical value, the adjusting may include maintaining the HEC connection to the one of the plurality of source devices from which content is being displayed and interrupting the HEC connection to at least of the remaining ones of the plurality of source devices.

As an alternative, instead of interrupting the HEC connection, the amount of the HEC bandwidth for the at least one of the remaining ones of the plurality of source devices may be reduced.

The method further includes comparing the HEC bandwidth of the one of the plurality of source devices from which content is being displayed with a second critical value set on the basis of the upstream bandwidth capacity, and further includes resuming the interrupted HEC connection to the at least one source device when the HEC bandwidth of the one of the plurality of source devices from which content is being displayed is less than the second critical value.

The method further comprises resuming the interrupted HEC connection to the at least one of the source devices (i.e., the device or devices that were previously interrupted or disconnected) in an order based on a priority previously set by a user.

The method further comprises resuming the interrupted HEC connection to the at least one of the plurality of source devices (i.e., the device or devices that were interrupted or disconnected) in an order based on a frequency of user selection.

At least one source device may be sequentially selected from the source devices from which the HEC connection was previously disconnected, so that the HEC connection thereto is resumed.

When a new source device is connected to the image processing apparatus, the steps to carry out the obtaining of the comparison result are performed, and when the thus-obtained comparison result indicates that the detected HEC bandwidth exceeds the first critical value, the HEC connection to the one of the plurality of source devices from which content is being displayed and also the HEC connection to the new source device are maintained, and the HEC connection to the remaining source devices is interrupted.

In another exemplary embodiment, when a new source device is connected to the image processing apparatus, and when the comparison result indicates that the detected HEC bandwidth exceeds the first critical value, the HEC connection to the new source device may be interrupted as well.

A recording medium in which stores programs to carry out a method for connecting HDMI Ethernet Channel (HEC) of an image processing apparatus, the method for HEC connection comprising detecting a HEC bandwidth used in a plurality of source devices connected to the image processing apparatus through HEC, comparing the detected HEC bandwidth with a first critical value set on the basis of an upstream bandwidth capacity available to the image processing apparatus, and when the detected HEC bandwidth exceeds the first critical value, maintaining that connection to the one of the plurality of source devices from which content is being displayed and interrupting the HEC connection to at least one of the remaining ones of the plurality of source devices.

The method for HEC connection further comprises comparing the detected HEC bandwidth of the one of the plurality of source devices from which content is being displayed, with a second critical value set on the basis of the upstream bandwidth capacity, and resuming the interrupted HEC connection to the at least of the remaining ones of the plurality of source devices.

According to another exemplary embodiment, an image processing apparatus includes a plurality of source device ports, a network port, and a control unit controlling the plurality of source device ports and the network. The control unit monitors an upstream bandwidth passing through the network port. When the upstream bandwidth passing through the network port exceeds a first threshold, the control unit carries out an interruption operation with respect to the plurality of source device ports, except for one of the plurality of source device ports from which content is being displayed.

The control unit may monitor the upstream bandwidth through the network port over a High Definition Multimedia Interface Ethernet Channel (HEC).

When the upstream bandwidth passing through the network port falls below a second threshold, the control unit stops carrying out the interruption operation, with respect to at least one of the plurality of source device ports. The at least one of the plurality of source device ports is selected based on a frequency of user selection. Alternatively, the control unit stops the interruption operation with respect to the plurality of source device ports, one at a time, selected on a sequential basis.

According to the exemplary embodiments, there is provided (a.) an effect of preventing the degradation of a source device which is being watched in the event that the HEC bandwidth exceeds the upstream bandwidth capacity, and (b.) an effect of efficient management of HEC bandwidth.

BRIEF DESCRIPTION OF THE DRAWINGS

The above and/or other aspects will be more apparent by describing in detail exemplary embodiments, with reference to the accompanying drawings, in which:

FIG. 4 is a sequence diagram illustrating a method for connecting a HEC of an image processing apparatus according to another exemplary embodiment. In

DETAILED DESCRIPTION

Figure 1:
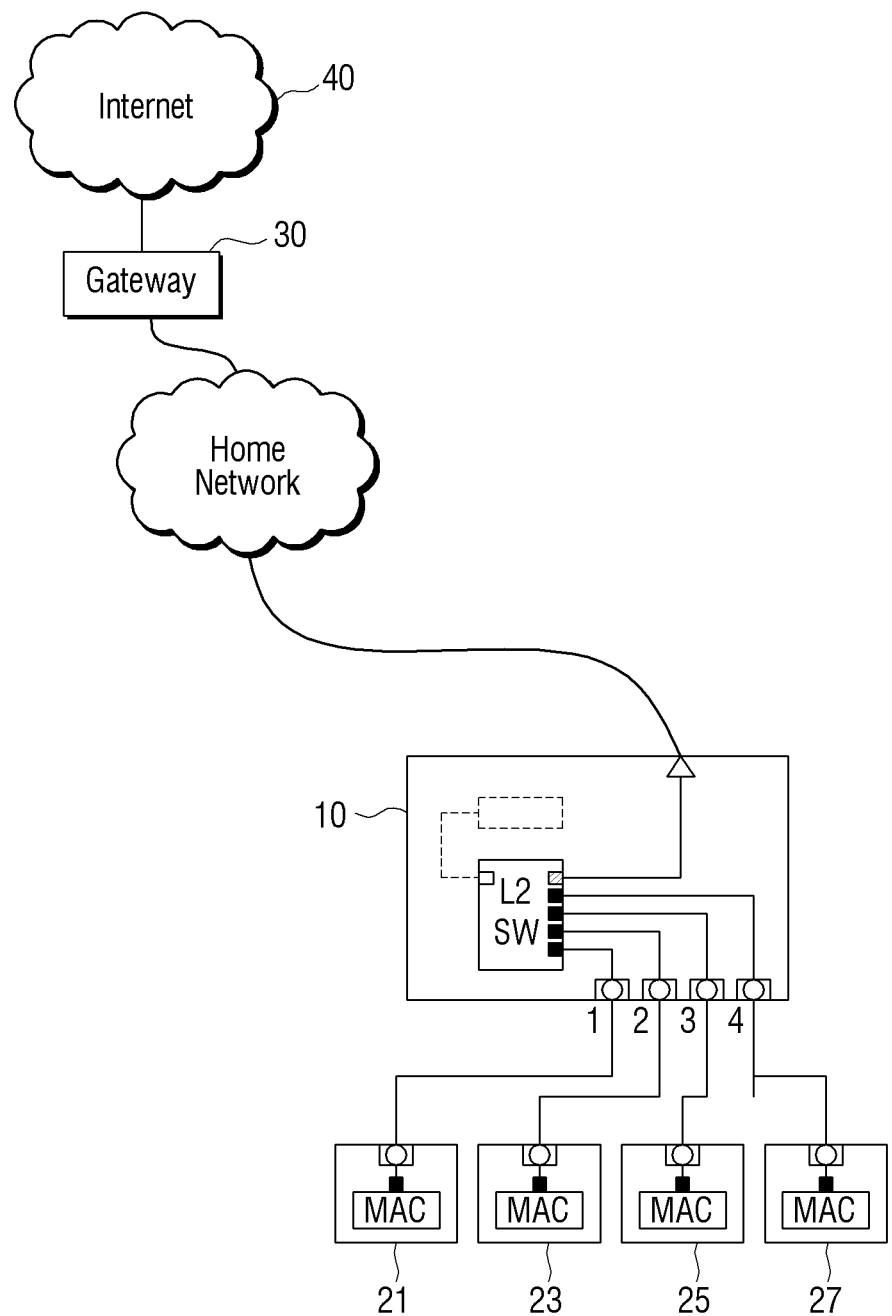
FIG. 1 is a block diagram illustrating a network of an image processing apparatus according to an exemplary embodiment.

Hereinafter, exemplary embodiments will be described in greater detail with reference to the accompanying drawings.

In the following description, the same reference numerals are used for the same elements throughout the drawings. The matters defined in the description, such as detailed construction and elements, are provided to assist in a comprehensive understanding of the exemplary embodiments. Thus, it will be appreciated that the exemplary embodiments can be carried out without those specifically defined matters. Also, functions or elements in the related art are not described in detail since such a discussion might obscure the exemplary embodiments with unnecessary detail.

FIG. 1 is a block diagram illustrating a network of an image processing apparatus according to an exemplary embodiment. As shown in FIG. 1, an image processing apparatus (10) is connected by a plurality of source devices (21, 23, 25, and 27) and a plurality of HECs (HDMI Ethernet Channels) via HEC ports 1 to 4 constituting a plurality of source device ports.

The image processing apparatus (10) may be a TV, BDP (Blue-ray Display Player), or Receiver. The image processing apparatus (10) can support HEC. The plurality of source devices (21, 23, 25, and 27) includes multimedia source devices such as camcorders, DVD (Digital Versatile Disc) players, video game consoles, and set-top boxes, which provide digital contents.

Also, the image processing apparatus (10) can be connected, via a network port, through a home network and gateway (30) to the internet (40). The amount of available upstream bandwidth to the Internet can be determined in the image processing apparatus (10), and varies depending on the type of communication line of the home network (30).

Figure 2:
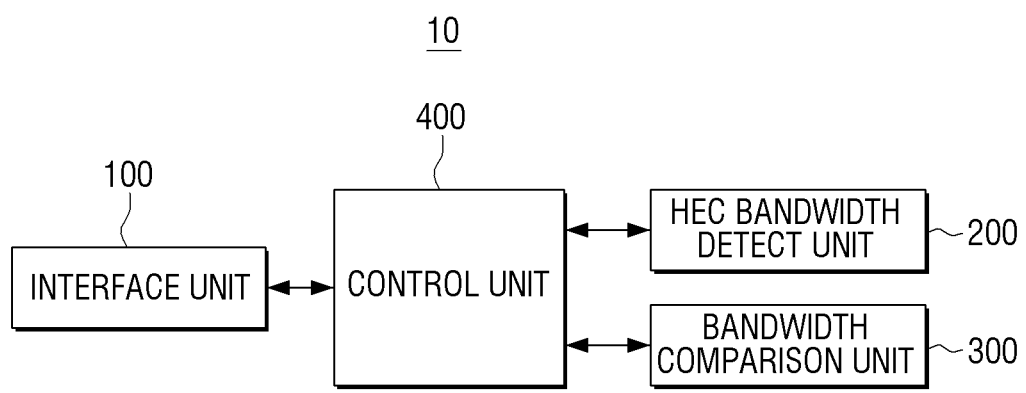
FIG. 2 is a block diagram illustrating an image processing apparatus according to an exemplary embodiment.

FIG. 2 is a block diagram illustrating an image processing apparatus (10) according to an exemplary embodiment. Referring to FIG. 2, the image processing apparatus (10) includes an interface unit (100), a HEC bandwidth detect unit (200), a bandwidth comparison unit (300), and a control unit (400).

The interface unit (100) is HDMI-compliant, and interfaces with a plurality of source devices through HEC. The interface unit (100) can be constituted in the image processing device (10), and the image processing device (10) can interface with a plurality of source devices. In other words, the interface unit (100) comprises or controls the plurality of source device ports (HEC1-HEC4). It may also comprise or control the network port.

The HEC bandwidth detect unit (200) can detect the amount of HEC bandwidth that is being used by the plurality of source devices. Specifically, the HEC bandwidth detect unit (200) can detect the HEC bandwidth that is being used between a plurality of source devices and an image processing apparatus.

The bandwidth comparison unit (300) can compare the currently used HEC bandwidth with a first critical value. The first critical value may be determined on the basis of the upstream bandwidth capacity available to the image processing apparatus (10). The upstream bandwidth capacity is a value that depends on a number of things, including the status of the wired/wireless communication line connected to the image processing apparatus (10) at the network port. The upstream bandwidth capacity will tend to vary within a certain range, according to the situation. However, for the sake of understanding the exemplary embodiments, this variation is not discussed and it is generally assumed that there is a regular upstream bandwidth.

According to one exemplary embodiment, a first critical value, or threshold, is established. The first critical value is smaller in size than the upstream bandwidth capacity. It is preferable to establish the first critical value having a value of 90% of the upstream bandwidth capacity. The first critical value may optionally be user-adjustable.

For the remainder of the discussion, it will be assumed that the first critical value is set at 90% of the upstream bandwidth capacity, the bandwidth comparison unit (300) can compare the first critical value of 90% of the upstream bandwidth capacity with a HEC bandwidth detected by the HEC bandwidth detect unit (200). The bandwidth comparison unit (300) can make a determination as to whether the detected HEC bandwidth is larger or smaller than the first critical value. If the first critical value is the same as the detected HEC bandwidth, the bandwidth comparison unit (300) may be set so as to render a determination that the detected HEC bandwidth exceeds the first critical value.

The bandwidth comparison unit (300) can be embodied as an OP-amp or the like, in terms of hardware, and can be embodied by a comparative algorithm, in terms of software.

In this regard, since those familiar with this field can readily understand the above matter, a more detailed explanation thereof is omitted.

The control unit (400) can adjust the connection with at least one of the plurality of source device (21, 23, 25, and 27) in response to the determination made after the comparison is carried out by the bandwidth comparison unit (300).

At this point, the control unit (400) can maintain or interrupt the HEC connection between the image processing apparatus (10) and at least one of the source devices.

In this context, the term, "maintain a connection" means maintaining a status in which (a.) the image processing apparatus (10) is connected electrically to a source device and (b.) data (e.g., packets) exchange takes place between the image processing apparatus (10) and the source device. On the other hand, to "interrupt a connection" means a status in which (a.) the image processing apparatus (10) may be connected electrically to a source device, but (b.) data exchange does not take place between the image processing apparatus (10) and the source device.

Depending on the specific implementation, the control unit (400) may interrupt the connection between the image processing apparatus (10) and a source device either by simply stopping the data exchange while leaving the electrical connection intact, or by interrupting the electrical connection which will stop the data exchange as well.

Also, when the control unit (400) interrupts the HEC connection with at least one of the source devices, in response to a determination of the bandwidth comparison unit (300) that the detected HEC bandwidth exceeds the first critical value, the control unit maintains the connection with the one of the source devices that is currently being watched. In this context, "currently being watched" does not mean that a user is necessarily watching a content output by the device. It simply means that content from that particular source device is being output. Hereafter, "being watched" and "being displayed" may be understood to have the same meaning Thus, in other words, the control unit maintains the connection with one of the source devices from which content is being displayed Likewise, when control unit (400) interrupts the HEC connection with at least one of the source devices, in response to a determination of the bandwidth comparison unit (300) that the detected HEC bandwidth is the same as the first critical value, the control unit maintains the connection with the one of the source devices that is currently being watched (i.e., the connection is maintained with one of the source devices from which content is being displayed).

That is to say, when the control unit (400) interrupts the HEC connection to the source device, the data exchange between the image processing apparatus (10) and the source device is blocked, as mentioned above. The image processing apparatus (10) may still be electrically connected to the source device, depending on the implementation, and this may lead to an infinitesimal current or noise level. However, information data exchange does not take place between the image processing apparatus (10) and the source device. In other words, the control unit (400) carries out an interruption operation with respect to the plurality of source device ports, except for the source device port from which content is being displayed.

The control unit (400) may resume the HEC connection to at least one of the other source devices once the detected HEC bandwidth (from the source device which is being watched) is less than a second critical value. The second critical value, which may be a second threshold, maybe sent based on a percentage of the upstream bandwidth capacity.

For example, the second critical value may be set to 50% of the upstream bandwidth capacity. The second critical value may be user-adjustable, as well.

The control unit (400), instead of interrupting a connection with a source device, may reduce the bandwidth of the source device when the detected HEC bandwidth is detected by the bandwidth comparison unit (300) as exceeding the first critical value. To "reduce the bandwidth" of the source device can be realized by reducing the number of packets of data that are allowed to be exchanged.

The control unit (400) may resume the connection to at least one of the other source devices from which the connection had been previously disconnected. The resumption of connection may be carried out according to a priority scheme previously set by a user. As to the previously established priority, a user can set priority by source device in any arbitrary order, and can likewise set it freely in an ascending priority order or a descending priority order.

The priority scheme used by the control unit (400), when making a determination as to which of the disconnected source devices should be resumed, may alternatively be set according to the frequency with which a user selects and uses a source device, that is to say, a frequency of user selection. The control unit (400), when operating under such a frequency of user selection priority scheme, can resume the HEC connection to at least one of the disconnected source devices according to the selection frequency. In this manner, the source devices that the user selects the most can be connected with preference. To implement this approach, a database or the like may be separately built, so as to store the selection frequency. In other words, when the upstream bandwidth passing through the network port falls below the second critical value, the control unit stops carrying out the interruption operation with respect to at least one of the plurality of source device ports. The control unit may first stop interrupting one of the plurality of source device ports which is selected based on a frequency of user selection.

The priority scheme used by the control unit (400), when making a determination as to which of the disconnected source devices should be resumed, may alternatively be set so that disconnected source devices are selected sequentially for resumed connection. The control unit (400) may sense the disconnected source devices. This makes it possible to consider source devices, in which the packet exchange is not occurring as source devices that were previously disconnected by the control unit (400). The connection may be resumed arbitrarily among the disconnected source devices.

The bandwidth comparison unit (300) compares the second critical value with the current HEC bandwidth of the source devices which are being watched, which is detected by the HEC bandwidth detect unit (200). On the basis of the result of the comparison of the bandwidth comparison unit (300), the control unit (400) arbitrarily resumes the connection to at least one disconnected source device. That is to say, the control unit may stop interrupting one of the plurality of source device ports, one at a time, selected on a sequential basis. The first one selected may be selected on an arbitrary basis.

Thus the source device, to which the HEC connection is resumed, is connected to the image processing apparatus (10) through HEC and resumes exchanging data with the image processing apparatus (10).

In summary, the priority schemes for resuming the a connection to at least one of the disconnected source devices include a frequency of user selection approach, a random approach, and a sequential approach.

Next, consideration will be given to the situation in which a new source device is connected to the interface unit (100). when a new source device is connected to the interface unit (100), the control unit (400) may control the HEC bandwidth detect unit (200) and the bandwidth comparison unit (300) so as to detect HEC bandwidth and compare the detected HEC bandwidth with the first critical value.

When the bandwidth comparison unit (300) determines that the detected HEC bandwidth exceeds the first critical value, the control unit (400) interrupts the connection to the source devices other than the source device which is being watched, and also other than the new source device.

The control unit (400) may regularly search to detect the introduction of new source devices to the interface unit (100). The search cycle can be established at regular time intervals such as 10, 20, 30 minutes, or 1 hour, etc. Or, the control unit (400) may search in response to a user's arbitrary request. Alternatively, when the new source device is connected to the interface unit (100), a signal may automatically be sent to the control unit (400), as a notification that the new source device is connected to the image processing apparatus (10).

When a new source device is connected to the interface unit (100), the control unit (400) may control the HEC bandwidth detect unit (200) and the bandwidth comparison unit (300) so as to detect the HEC bandwidth of the source device and compare the detected HEC bandwidth with a first critical value.

The control unit (400) may interrupt HEC connection between the image processing apparatus (10) and the new source device if the detected HEC bandwidth exceeds the first critical value. The control unit (400) does not interrupt the HEC connection to the new source device, but interrupts the HEC connection to at least one of the other source devices except for the source device currently being watched.

Figure 3:
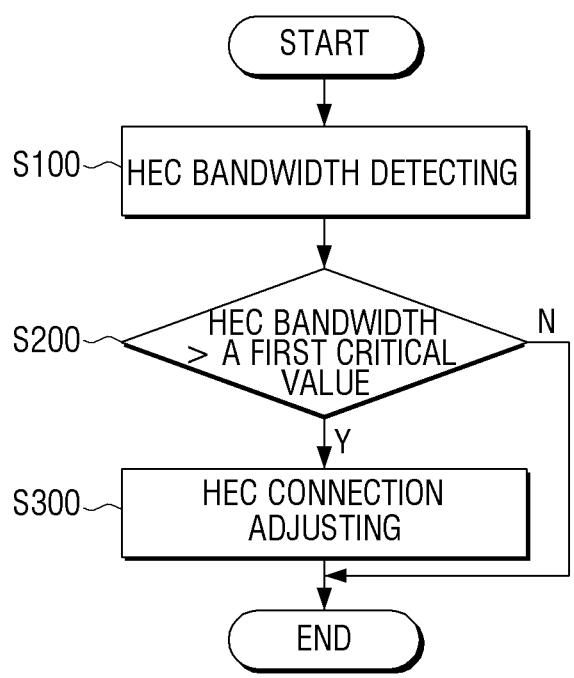
FIG. 3 is a sequence diagram illustrating a method for connecting a HEC of an image processing apparatus according to another exemplary embodiment.

FIG. 3 is a sequence diagram illustrating a method for HEC connection control, of an image processing apparatus, according to an exemplary embodiment. Referring to FIG. 3, the method for HEC connection control of an image processing apparatus may include the following steps: detecting the HEC bandwidth (S100), comparing the detected HEC bandwidth (S200), and adjusting the connection to source devices (S300).

More specifically, the step of detecting the HEC bandwidth (S100) detects the HEC bandwidth used by a plurality of source devices connected by HEC. A detailed explanation on detecting HEC bandwidth has already been provided.

The comparing of the HEC bandwidth (S200) is a step of comparing the detected HEC bandwidth with the first critical value mentioned above.

According to the comparison result of the comparing of the HEC bandwidth (S200), a control operation may be performed during the HEC connection adjusting step (S300) so as to make an adjustment of the connection to at least one of the source devices.

When the detected HEC bandwidth is compared with the first critical value if the detected HEC bandwidth exceeds the first critical value, the HEC connection adjusting step (S300) is carried out so that the connection to at least one source device, with the exception of the source device which is being watched, may be adjusted.

The adjusting (S300) HEC connection is a step of maintaining the HEC connection between the image processing apparatus (10) and the source device which is being watched and interrupting the HEC connection of the remaining source devices. In one exemplary embodiment, the method for blocking the HEC connection of the source devices is to interrupt the HEC connection of the source devices arbitrarily, based for example on the order of the MAC addresses of the source devices, or, alternatively, on a non-arbitrary basis such as the detected size of HEC bandwidth of the source devices.

The adjusting (S300) HEC connection step may function so as to reduce the amount of bandwidth that is being used down to a level that is less than the first critical value.

Figure 4:
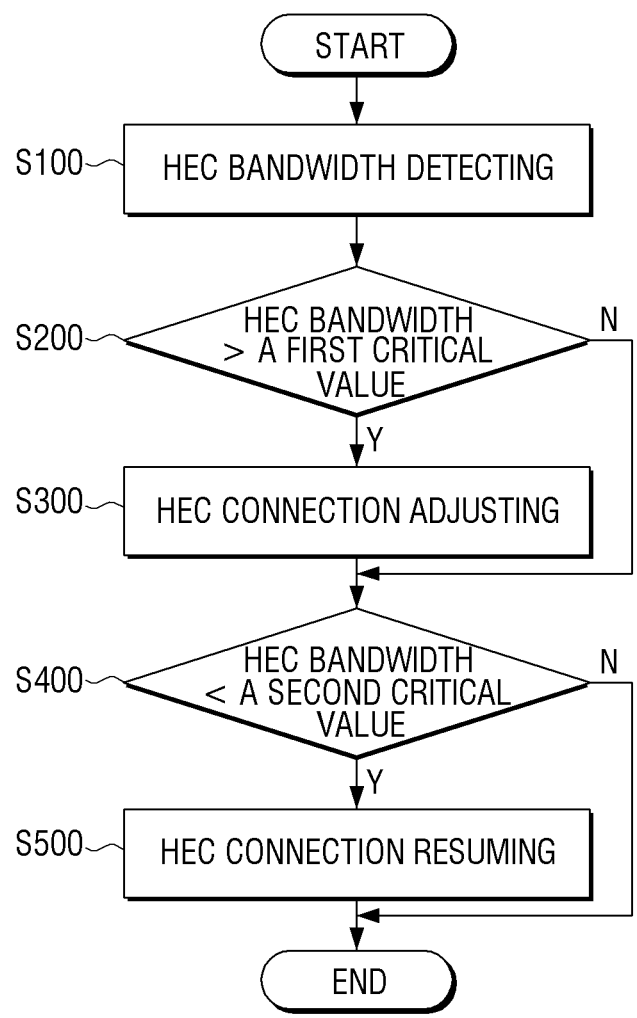

FIG. 4 is a sequence diagram illustrating a method for HEC connection control for an image processing apparatus according to another exemplary embodiment. Referring to FIG. 4, the method may further include comparing a second critical value (S400) and resuming the HEC connection (S500).

More specifically, the comparing of a second critical value (S400) is a step of comparing the second critical value as previously explained, above.

The comparing of the second critical value (S400) may further perform the resuming (S500) of the HEC connection of at least one of the disconnected source devices, when the HEC bandwidth, of the source device which is being watched, is less than the second critical value.

The resuming HEC connection (S500) step may initiate the resuming of the HEC connection of at least one of the disconnected source devices, in an order that reflects a priority previously set by a user.

Alternatively, the resuming HEC connection (S500) step may initiate the resuming of the HEC connection of at least one of the disconnected source devices, in an order that reflects the frequency with which a user used the source devices.

The resuming HEC connection (S500) step may initiate the resuming of the HEC connection by sequentially selecting at least one of the disconnected source devices.

The method for HEC connection of an image processing apparatus according to another exemplary embodiment may adjust the HEC connection of a plurality of source devices when it is detected that a new source device has been connected to the image processing apparatus (10).

In other words, the adjusting of the connection of at least one source device among the plurality of source devices (S300) may be performed according to the result of a comparison between the detected HEC bandwidth, of the source devices comprising the newly connected source device, and a second critical value.

In response to the result of the comparing HEC bandwidth step (S200), when the comparison indicates that the detected HEC bandwidth exceeds a first critical value, the adjusting (S300) of the HEC connection may be performed so as to interrupt the connection to the source devices other than the source device being watched and the newly connected source device.

Also, the detecting of the HEC bandwidth (S100) step may be performed when a new source device is connected to the image processing apparatus (10). According to the comparison result after the comparing HEC bandwidth (S200), the adjusting (S300) of the connection of at least one source device among the plurality of source devices may interrupt the HEC connection of also the newly connected source device when the detected HEC bandwidth exceeds the first critical value.

According to another exemplary embodiment, the system as described above may concretely be implemented as a non-transitory recording medium storing a program that performs the method for HEC connection control for an image processing apparatus.

Regarding the recording medium storing a program to perform the method for HEC connection control for an image processing apparatus, the HEC connection control method may comprise detecting the HEC bandwidth used in a plurality of source devices connected to the image processing apparatus through HEC, comparing the detected HEC bandwidth with a first critical value as described above, and, when the detected HEC bandwidth exceeds the first critical value, interrupting the HEC connection of at least one source device but not the source device which is being watched.

Regarding the recording medium storing a program to perform the method for HEC connection of an image processing apparatus, the HEC connection method may further include comparing the detected HEC bandwidth, of the source device which is being watched, with a second critical value established as mentioned above and resuming the HEC connection of at least one of the disconnected source devices when the detected HEC bandwidth of the source device which is being watched is less than the second critical value.

The methods for HEC connection of an image processing apparatus according to the foregoing exemplary embodiments may be stored in many different types of recording media and can be embodied by a program code carried out by a CPU or other microprocessor built in various electronic devices.

Specifically, the code to perform the methods can be stored in many different types of non-transitory recording media such as RAM (Random Access Memory), Flash Memory, ROM (Read Only Memory), EPROM (Erasable Programmable ROM), EEPROM (Electronically Erasable and Programmable ROM), Register, Hard Disk, Removable Disk, Memory Card, USB Memory, CD-ROM, etc.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those familiar with this field.

What is claimed is:

1. An image processing apparatus, comprising at least one processor for implementing:
   an interface connected to a plurality of source devices according to a predetermined communication method;
   a bandwidth detector which detects a bandwidth used in the plurality of source devices; and
   a controller which compares the detected bandwidth with a first critical value set on the basis of an upstream bandwidth capacity available to the image processing apparatus and adjusts a connection to at least one of the plurality of source devices, except a connection with a source device from which content is currently being output, based on the comparison result of the bandwidth,
   wherein, when the comparison result indicates that the detected bandwidth exceeds the first critical value, the controller maintains the connection to the one of the plurality of source devices from which content is being displayed and interrupts the connection to at least one of the remaining ones of the plurality of source devices, and
   wherein the controller resumes the interrupted connection to the at least one of the plurality of source devices in an order based on a priority preset by a user.

2. The image processing apparatus as claimed in claim 1, wherein, when the comparison result indicates that the bandwidth exceeds the first critical value, the controller maintains the connection to the one of the plurality of source devices from which content is being displayed and reduces the bandwidth of at least one of the remaining ones of the plurality of source devices.

3. The image processing apparatus as claimed in claim 1, wherein the controller resumes the interrupted connection to the at least one of the source devices when the bandwidth of the one of the plurality of source devices from which content is being displayed is less than a second critical value, the second critical value having been previously set on the basis of the upstream bandwidth capacity available to the image processing apparatus.

4. The image processing apparatus as claimed in claim 1, wherein the controller resumes the interrupted connection to the at least one of the plurality of source devices in an order based on a frequency of user selection.

5. The image processing apparatus as claimed in claim 1, wherein the controller resumes the interrupted connection to the at least one of the plurality of source devices in a sequential order.

6. The image processing apparatus as claimed in claim 1, wherein:
   when a new source device is connected to the interface, the controller controls the bandwidth detector to detect a bandwidth of the new source device and compares the detected bandwidth of the new source device with the first critical value; and
   when the thus-obtained comparison result indicates that the detected bandwidth exceeds the first critical value, the controller maintains the connection to the one of the plurality of source devices from which content is being displayed and also the connection to the new source device and interrupts the HEC connection to the remaining ones of the plurality of source devices.

7. The image processing apparatus as claimed in claim 1, wherein:
   when a new source devices connected to the interface, the controller controls the bandwidth detector to detect a bandwidth of the new source device and compares the detected bandwidth of the new source device with the first critical value; and
   when the thus-obtained comparison result indicates that the detected bandwidth exceeds the first critical value, the controller maintains the connection to the one of the plurality of source devices from which content is being displayed and interrupts the connection to the new source device.

8. The image processing apparatus as claimed in claim 1, wherein the interface unit comprises at least one of a plurality of source device ports and network ports.

9. The image processing apparatus as claimed in claim 1, wherein the predetermined communication method comprises communication method through High Definition Multimedia Interface (HDMI) Ethernet Channels (HEC).

10. A method for controlling an image processing apparatus, the method comprising:
    detecting, by a processor, a bandwidth used in a plurality of source devices, the plurality of source devices being connected to the image processing apparatus according to a predetermined communication method;
    comparing, by the processor, the detected bandwidth with a first critical value set on the basis of an upstream bandwidth capacity available to the image processing apparatus;
    adjusting, by the processor, a connection to at least one of the plurality of source devices, except a connection with a source device from which content is currently being output, based on comparison result; and
    resuming the interrupted connection to the at least one of the plurality of source devices in an order based on a priority preset by a user,
    wherein, when the comparison result indicates that the detected bandwidth exceeds the first critical value, the adjusting comprises maintaining the connection to the one of the plurality of source devices from which content is being displayed and interrupting the connection to at least one of the remaining ones of the plurality of source devices.

11. The method as claimed in claim 10 wherein, when the comparison result indicates that the detected bandwidth exceeds the first critical value, the adjusting maintaining the connection to the one of the plurality of source devices from which content is being displayed and reducing the bandwidth of at least one of the remaining ones of the plurality of source devices.

12. The method as claimed in claim 10, further comprising:
    comparing the bandwidth of the one of the plurality of source devices from which content is being displayed with a second critical value set on the basis of the upstream bandwidth capacity; and
    resuming the interrupted connection to the at least one of the plurality of source devices when the bandwidth of the one of the plurality of source devices from which content is being displayed is less than the second critical value.

13. The method as claimed in claim 10, further comprising:
    resuming the interrupted connection to the at least one of the plurality of source devices in an order based on a frequency of user selection.

14. The method as claimed in claim 10, further comprising resuming the interrupted connection, to the at least one of the plurality of source devices, in a sequential order.

15. The method as claimed in claim 10, wherein:
    when a new source device is connected to the image processing apparatus, the comparison result is obtained; and
    when the thus-obtained comparison result indicates that the detected bandwidth exceeds the first critical value, the connection to the one of the plurality of source devices from which content is being displayed and also the connection to the new source device are maintained, and the connection to the remaining ones of the plurality of source devices is interrupted.

16. The method as claimed in claim 10, wherein:
    when a new source devices connected to the image processing apparatus, the comparison result is obtained; and
    when the thus-obtained comparison result indicates that the detected bandwidth exceeds the first critical value, the connection to the one of the plurality of source devices from which content is being displayed is maintained, and the connection to the new source device is interrupted.

17. The method as claimed in claim 10 wherein, the predetermined communication method comprises communication method through High Definition Multimedia Interface (HDMI) Ethernet Channels (HEC).

18. A non-transitory recording medium storing a program to perform a method for controlling an image processing apparatus, wherein the method comprises:
    detecting a bandwidth used in a plurality of source devices, the plurality of source devices being connected to the image processing apparatus according to a predetermined communication method;

comparing the detected bandwidth with a first critical value set on the basis of an upstream bandwidth capacity available to the image processing apparatus;

when the detected bandwidth exceeds the first critical value, maintaining the connection to the one of the plurality of source devices from which content is being displayed and interrupting the connection to at least one of the remaining ones of the plurality of source devices; and resuming the interrupted connection to the at least one of the plurality of source devices in an order based on a priority preset by a user.

19. The recording medium as claimed in claim 18, wherein the controlling method further comprises:

comparing the detected bandwidth of the one of the plurality of source devices from which content is being displayed with a second critical value set on the basis of the upstream bandwidth capacity; and resuming the interrupted connection to the at least one of the plurality of source devices when the detected bandwidth is less than the second critical value.

* * * * *